United States Patent [19]
Mehrgardt et al.

[11] Patent Number: 5,202,766
[45] Date of Patent: Apr. 13, 1993

[54] SOUND CHANNEL CIRCUIT FOR DIGITAL TELEVISION RECEIVERS

[75] Inventors: Sönke Mehrgardt, March; Heinrich Pfeifer, Denzlingen; Thomas Hilpert, Gundelfingen, all of Fed. Rep. of Germany

[73] Assignee: Deutsche ITT Industries GmbH, Freiburg, Fed. Rep. of Germany

[21] Appl. No.: 455,348

[22] PCT Filed: Nov. 6, 1987

[86] PCT No.: PCT/EP87/00682

§ 371 Date: Sep. 11, 1989

§ 102(e) Date: Sep. 11, 1989

[87] PCT Pub. No.: WO89/04576

PCT Pub. Date: May 18, 1989

[51] Int. Cl.$^5$ .............................................. H04N 5/60
[52] U.S. Cl. .................................. 358/198; 358/188; 364/731; 375/84; 329/306
[58] Field of Search ................. 358/198, 197, 188; 329/310, 306; 357/84; 364/731

[56] References Cited

U.S. PATENT DOCUMENTS

| | | | |
|---|---|---|---|
| 3,952,187 | 4/1976 | Robinson et al. | 235/186 |
| 3,991,377 | 11/1976 | Salazar et al. | 375/84 |
| 4,019,149 | 4/1977 | Kustka et al. | 329/107 |
| 4,415,928 | 11/1983 | Strolle et al. | 364/731 |
| 4,470,145 | 9/1984 | Williams | 329/308 |
| 4,710,814 | 12/1987 | Gassmann et al. | 358/197 |
| 4,901,151 | 2/1990 | Mehrgardt et al. | 358/198 |
| 5,097,220 | 3/1992 | Shimakata | 329/310 |
| 5,138,457 | 8/1992 | Sakai et al. | 358/198 |

FOREIGN PATENT DOCUMENTS 0204849  6/1985  European Pat. Off.

OTHER PUBLICATIONS

ICC '80, International Conference on Communications, Seattle, Wash., Jun. 8-12, 1980, Conference Record, vol. 3 of 3, IEEE P. R. Hirschler et al.: "A Study of DPSK", 53.2.1-53.2.7.
Preliminary Examination Report dated Aug. 16, 1989.
IEEE Transactions on Communications, Vo. Co.-34 No. 5, May 1986, F. M. Gardner; "A BPSK/QPSK Timing-Error Detector for Sampled Receivers".
Independent Broadcasting Authority, London, England, BBC, Specification of a Standard for UK Stereo-with-Television Transmissions, Sep. 1986.

*Primary Examiner*—James J. Groody
*Assistant Examiner*—Jeffrey S. Murrell
*Attorney, Agent, or Firm*—Thomas L. Peterson

[57] ABSTRACT

A circuit capable of handling all television sound transmission standards, including the "NICAM" standard. The circuit contains an analog antialiasing low-pass filter which is fed by the analog sound and video signal and followed by an analog-to-digital converter. The output of the latter is freed from the video signal by a filter circuit. The digital sound signal is applied to a phase splitter having a 0° output and a 90° output which are connected to a phase discriminator. An absolute-value output of the phase discriminator provides the amplitude-demodulated sound signal, while a phase-angle output feeds the DQPSK portion of a "NICAM" decoder and a differentiating stage, which delivers the frequency-modulated sound signal.

6 Claims, 4 Drawing Sheets 5,202,766

SOUND CHANNEL CIRCUIT FOR DIGITAL TELEVISION RECEIVERS

BACKGROUND OF THE INVENTION

1. Field of the Invention

The present invention relates to sound channel circuits for digital television receivers comprising at least one analog-to-digital converter and at least one digital-to-analog converter, as have been commercially available for some time.

2. Description of the Prior Art

In view of the different television sound transmission standards being used throughout the world, it is desirable to have a universally applicable sound channel circuit which makes it possible to demodulate all current and future television sound standards. Among the television sound standards to be expected for the future, a method is of interest in connection with the invention which is presently intended for introduction in Great Britain and Scandinavia and for which the abbreviation "NICAM" appears to be coming into use. It is described in a printed publication issued by the IBA and BBC in September 1986 and entitled "Specification of a Standard for UK Stereo-with-Television Transmissions".

SUMMARY OF THE INVENTION

Accordingly, the object of the invention as claimed is to provide a universally applicable sound channel circuit for digital television receivers. One of the advantages of the invention lies in the fact that a multi-standard television set capable of handling the different sound transmission standards can be built with a single integrated sound channel circuit, with the latter automatically adapting to the different standards during reproduction.

BRIEF DESCRIPTION OF THE DRAWING

The invention will now be explained in more detail with reference to the accompanying drawings, in which.

DETAILED DESCRIPTION OF THE PREFERRED EMBODIMENTS

In the figures of the drawings, the square blocks symbolize the digital subcircuits, which will be defined in more detail below and in which signals are processed in parallel. This parallel signal processing may also be performed by the so-called pipelining technique. The input and output signals are transferred over buses, which are symbolized in the figures of the drawings by the stripelike connecting lines, under control of a clock system. The sound channel circuit according to the invention is especially suitable for implementation with insulated-gate field-effect transistor integrated circuits, i.e., for MOS integration, which is understood to include CMOS integration, i.e., implementation with complementary field-effect transistors.

In the embodiments illustrated in the figures of the drawings it is assumed that, by means of a conventional tuner and a conventional mixer, the desired analog sound and video signal va has already been separated from the signals reaching the television receiver via the antenna and converted to the baseband, as is done in conventional digital television receivers.

Figure 1:
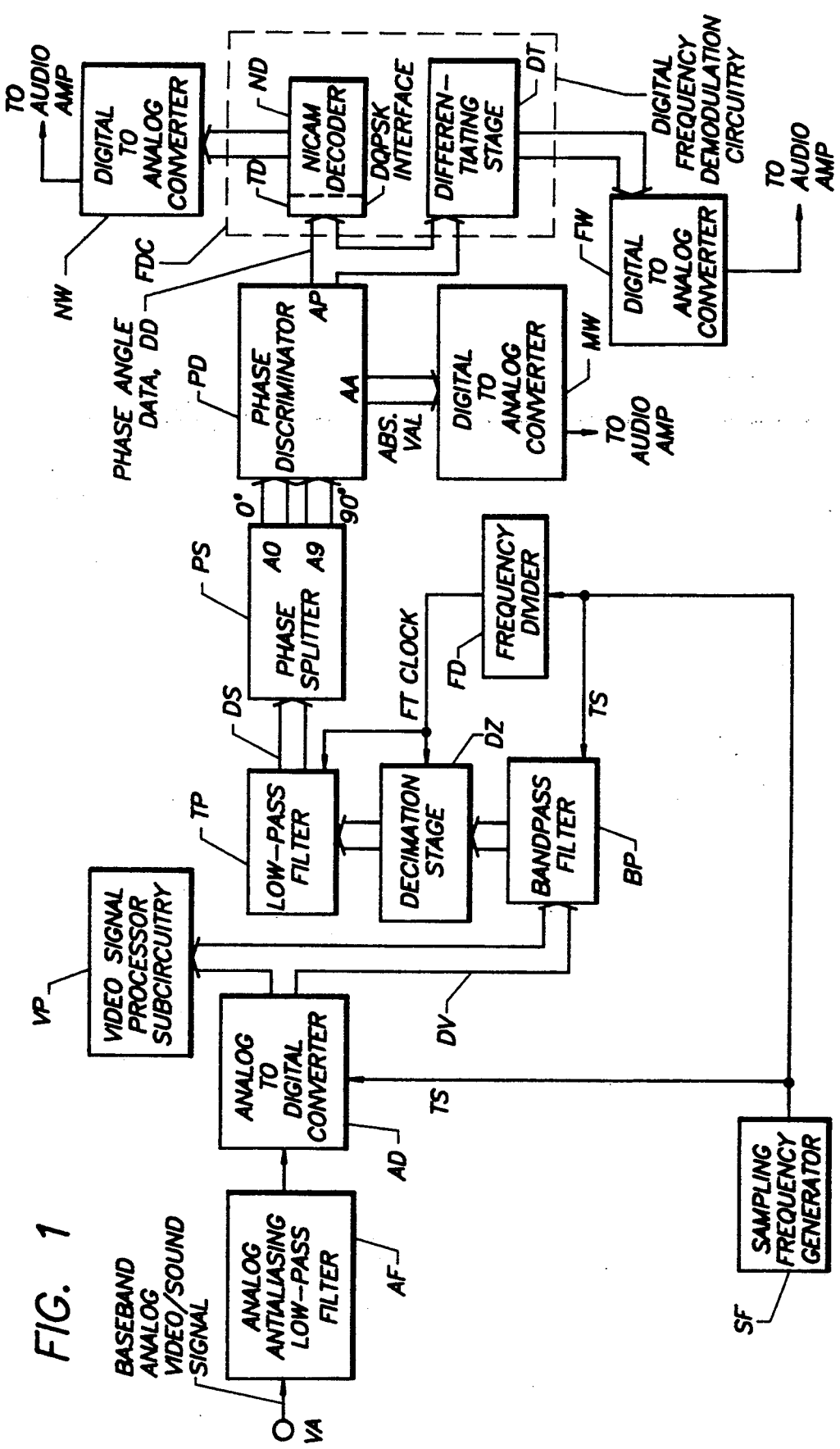
FIG. 1 is a highly schematic block diagram of a first variant of the solution according to the invention.
Figure 2:
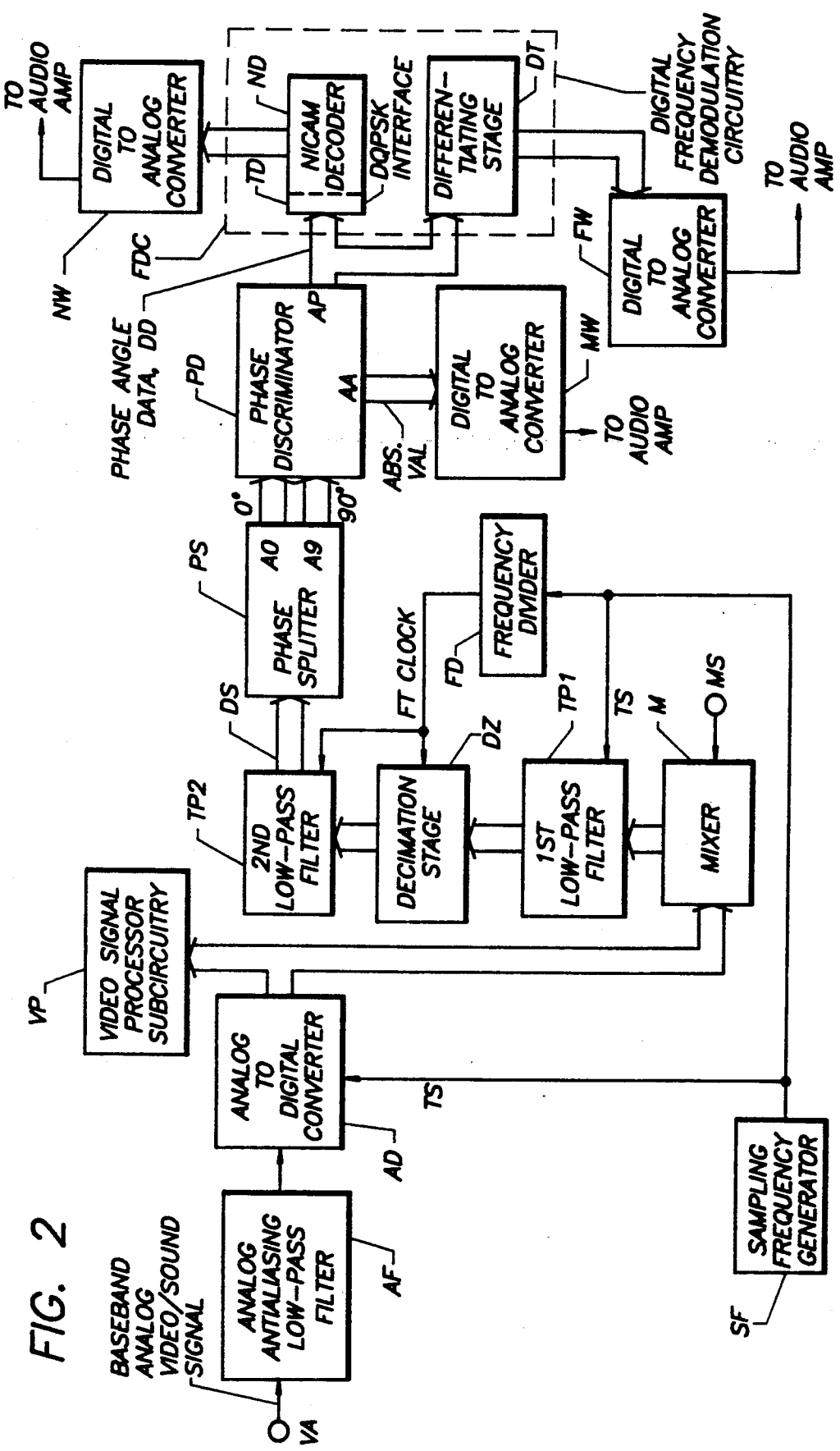
FIG. 2 is a highly schematic block diagram of a second variant of the solution according to the invention.
Figure 3:
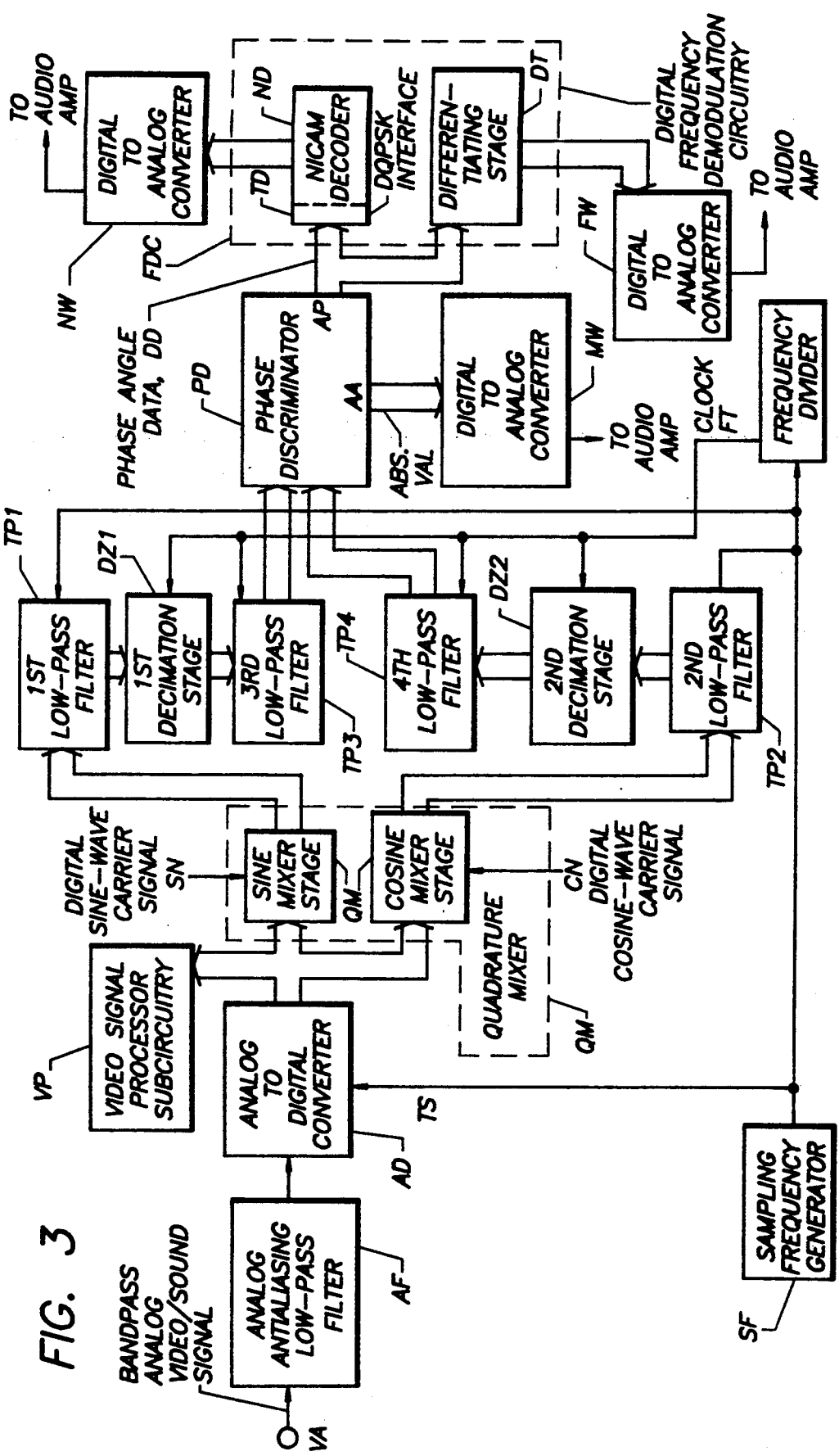
FIG. 3 is a highly schematic block diagram of a third variant of the solution according to the invention.

In all three variants of the solution according to the invention shown in FIGS. 1 to 3, the analog sound and video signal va is first applied to the analog antialiasing low-pass filter af, and the filtered signal is presented to the input of the single analog-to-digital converter ad. The sampling signal ts of the latter, generated by sampling frequency generator sf, has a frequency of the order of four times the chrominance-subcarrier frequency, i.e., the sampling frequency will generally lie between 15 MHz and 25 MHz. The antialiasing low-pass filter af separates those components from the analog signal which, if present, would result in disturbances after the analog-to-digital conversion.

The output of the analog-to-digital converter ad is connected to the bandpass filter bp, whose midfrequency and bandwidth are equal, respectively, to the received, television-standard-dependent sound carrier frequency and the associated bandwidth, hereinafter referred to as "useful band". The output of the bandpass filter bp is connected to the input of the decimation stage dz, whose clock signal ft is derived by dividing, in frequency divider fd the frequency of the sampling signal ts by such an integer that the useful band will not be affected by the decimation.

The output of the decimation stage dz is applied to the low-pass filter tp, whose frequency characteristic is as flat as possible in the pass region to pass the "useful band", i.e. to pass the bandwidth of the television-standard-dependent sound carrier.

In FIGS. 1 to 3 it is indicated that the output of the analog-to-digital converter ad may also be fed to the video-signal-processing subcircuits vp of the digital television receiver.

The output of the low-pass filter tp provides the desired digital audio signal ds. This signal is fed to the phase splitter ps, which has the 0° output a0 and the 90° output a9. It can be implemented with a Hilbert filter, for example, or with any other circuit which shifts the phase of an input signal by 90°, i.e., produces a signal orthogonal to the input signal.

The 0° output a0 and the 90° output a9 of the phase splitter ps are each coupled to one of two inputs of the phase discriminator pd, which has the absolute-value output aa and the phase-angle output ap. Connected to the latter are the DQPSK portion td of the decoder nd for the above-mentioned "NICAM" standard and the differentiating stage dt, which completes the digital frequency demodulation circuitry fdc. The absolute-value output aa, which, in the presence of an amplitude-modulated input signal, provides the corresponding digital amplitude-demodulated signal, the output of the decoder nd, and the output of the differentiating stage dt are followed by digital-to-analog converters mw, nw, and fw, respectively. The output of each digital-to-analog converter is connectable to a conventional analog sound channel amplifier with loudspeaker (indicated by the arrows at the outputs).

The second variant of the solution according to the invention, shown schematically in FIG. 2, differs from the first variant of FIG. 1 in that the output of the analog-to-digital converter ad is coupled to the input of the mixer m, which converts the incoming signal to the baseband of the sound signal. Therefore, the digital input signal ms has a frequency equal to or in the vacinity of the sound carrier in the combined audio/video signal (in baseband position). The output of the mixer m feeds the first low-pass filter tp1, whose frequency response has a zero just below one-half the sampling frequency reduced by the bandwidth of the sound signal contained in the received, television-standard-dependent signal.

The output of the first low-pass filter tp1 is coupled to the decimation stage dz, whose clock signal ft has a frequency equal to, e.g., one quarter of the frequency of the sampling signal ts, and which is followed by the second digital low-pass filter tp2, whose frequency response has a zero just above the useful band and is as flat as possible in the pass region to pass the "useful band", i.e. to pass the bandwidth of the television-standard-dependent sound carrier.

The other parts of the embodiment of FIG. 2 are identical with those of the embodiment of FIG. 1 designated by the same reference characters, so that they need not be explained again.

The third variant of the solution according to the invention, whose block diagram is shown in FIG. 3, differs from the two other variants in that the output of the analog-to-digital converter ad is applied to the two stages (sine and cosine) of the quadrature mixer qm, which again converts the incoming signal to the baseband of the sound signal. The two portions of the quadrature mixer qm are fed by the digital sine-wave carrier signal sn and the digital cosine-wave carrier signal cn, respectively.

The outputs of the sine and cosine portions of the quadrature mixer qm are coupled to the first low-pass filter tp1 and the second low-pass filter tp2, respectively, whose frequency responses have a zero just below one-half the sampling frequency reduced by the bandwidth of the sound signal contained in the received, television-standard-dependent signal. The outputs of the first and second low-pass filters tp1, tp2 are coupled to the first decimation stage dz1 and the second decimation stage dz2, respectively, whose common clock signal ft has a frequency equal to, e.g., one quarter of the frequency of the sampling signal ts.

The outputs of the first and second decimation stages dz1, dz2 are connected to the third low-pass filter tp3 and the fourth low-pass filter tp4, respectively. The frequency responses of these low-pass filters have a zero above the useful band and are as flat as possible in the pass region to pass the "useful band", i.e. to pass the bandwidth of the television-standard-dependent sound carrier.

The outputs of the third and fourth low-pass filters tp3, tp4 are coupled to the first and second inputs, respectively, of the phase discriminator pd, which has the absolute-value output aa and the phase-angle output ap. The remainder of the circuit is identical with that of FIGS. 1 and 2.

The universal applicability of the sound channel circuits according to the invention is based on the fact that mutually orthogonal signals are first produced by means of the phase splitter ps and then used by the phase discriminator pd to derive an absolute-value signal and an angle signal. If the sound carrier is amplitude-modulated, the absolute-value signal represents the demodulated sound information; in the presence of frequency modulation or differential quadrature phase-shift-keying modulation, the sound signal can be derived from the phase signal. In the above-mentioned "NICAM" standard, the sound signal is derived directly from the angle signal, while in the presence of frequency modulation, it is derived from the angle signal via the differentiating stage dt. In the German television stereo sound standard, demodulation of both stereophonic channels can be achieved by dual utilization of the phase discriminator by time-division multiplexing.

Figure 4:
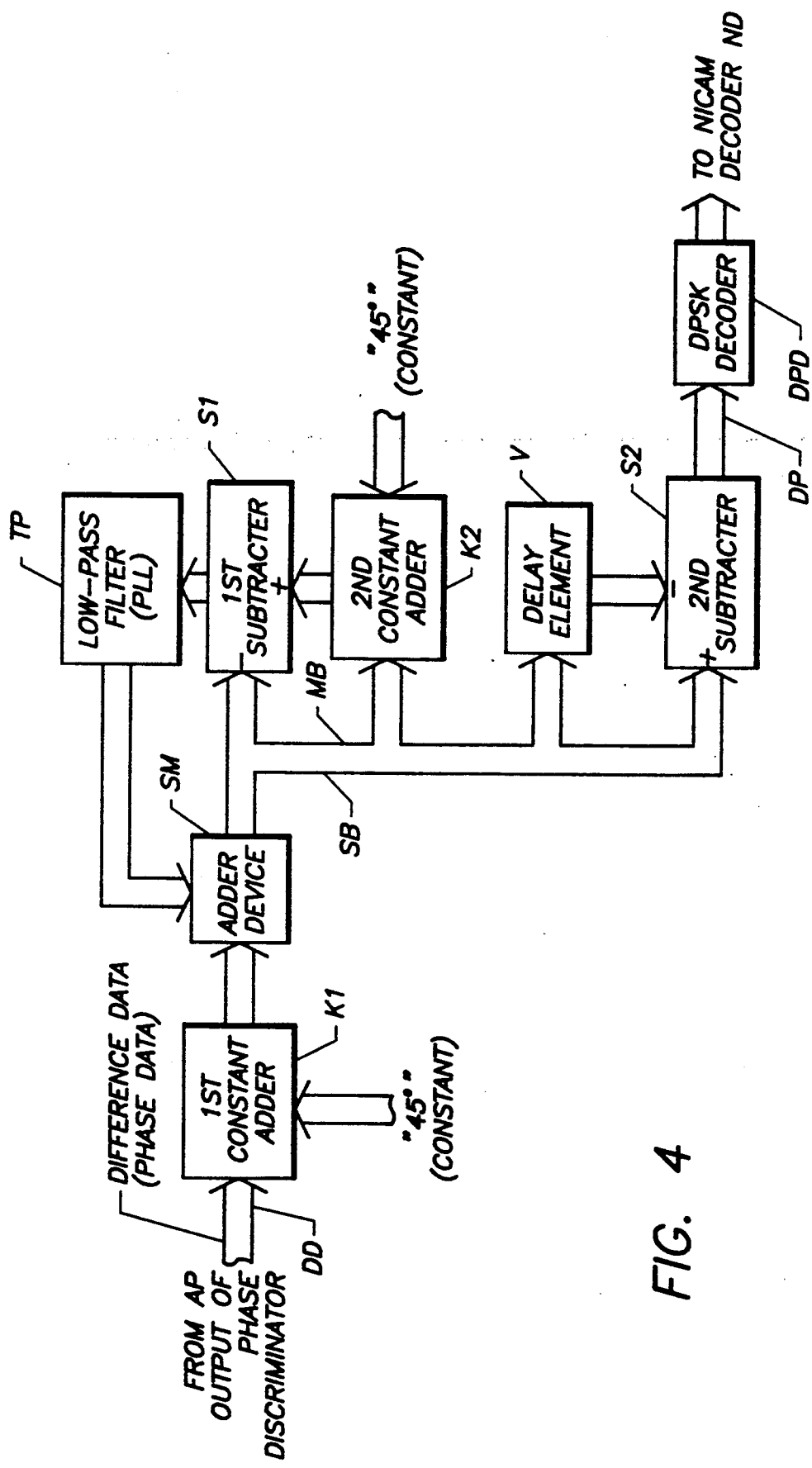
FIG. 4 is a highly schematic block diagram of a DQPSK decoder portion of the above-mentioned "NICAM" standard which can be used to advantage in the invention.

FIG. 4 shows a block diagram of the preferred embodiment of the DQPSK portion td of the decoder nd for separating DPSK data pairs dp from the phase-angle or -difference data dd derived in a conventional manner by "timing recovery" from the signals appearing at the phase-angle output ap of the phase discriminator pd, cf. "IEEE Transactions on Communications", May 1986, pages 423 to 429.

To make it easier to understand the following description, the differential quadrature or quarternary phase-shift-keying modulation technique, abbreviated DQPSK, will first be dealt with. For the clocked transmission of serial binary data over a band-limited channel, the stream of binary data is first grouped into a clocked sequence of pairs of two-bit data, also called "symbols", so that the four digital words 00, 01, 10, 11 are formed. If the clock frequency of the stream of binary data is called "data rate", the symbol rate is equal to half the data rate.

If these (two-bit) digital words are interpreted as coordinates of a rectangular coordinate system and regarded as binary numbers in the two's complement representation, they can be used to represent the four intersections of the unit circle with the coordinate axes, i.e., the four angles 0°, 90°, 180°, and 270°. In differential quadrature phase-shift keying, such digital words are used as DPSK data pairs to represent the phase difference from the preceding phase value, such that the DPSK data pairs 00, 10, 11, and 01 are equivalent, for example, to the phase differences 0°, 90° or −270°, +/−180°, and 270° or −90°, respectively.

For transmission, the DPSK data pairs are filtered by analog or digital devices; in the latter case, the frequency of the clock signal for the two digital filters necessary for this purpose will generally be higher than the above-mentioned clock frequency.

After the filtering, the output signals are subjected to quadrature amplitude modulation, namely to analog quadrature modulation after analog filtering and to digital quadrature modulation after digital filtering, i.e., the carrier then is not a continuous signal but consists (only) of sampled amplitudes of the carrier signal in accordance with the sampling theorem.

Following this quadrature modulation, the mutually orthogonal signals of the two "channels" are added together and then converted from digital to analog form. In this form they are placed on the transmission path.

At the receiving end, analog-to-digital conversion is performed at a correspondingly high sampling rate, which is followed by (digital) quadrature amplitude demodulation, so that the two outputs of the demodulator provide a stream of digital orthogonal signal pairs. Subsequent low-pass filtering of the two channels yields a signal pair from which the symbol rate (=twice the data rate) must be recovered with respect to frequency and phase. This can be done in the manner described in the journal "IEEE Transactions on Communications", May 1986, pages 423 to 429, for example.

The signal processing described with the aid of FIGS. 1 to 3, including the timing recovery, is performed in the television receiver. The phase data dd at the output ap of the phase discriminator pd, which contain the information on the phase difference explained above, are still multi-bit digital words from which the phase-difference data must be separated. This is done with the arrangement of FIG. 4.

The phase data dd is fed to the first constant adder k1, which is also supplied with the digital word "45°", corresponding to the phase angle 45°. Its output is coupled to the first input of the adder sm, whose output is connected to the subtrahend input of the first subtracter s1.

Also provided is the second constant adder k2, which, like the constant adder k1, is fed with a constant in the form of the digital word "45°", corresponding to the phase angle 45°, and whose output is coupled to the minuend input of the first subtracter s1. The sign bit sb and the most significant bit mb of the output of the adder sm are applied as a two-bit signal to the second input of the constant adder k2, to the input of the delay element v, and to the minuend input of the second subtracter s2, whose output provides the phase-difference data dp and is connected to a DPSK decoder dpd followed by the "NICAM" decoder nd. The delay introduced by the delay element v is equal to the period of the original data rate of the DPSK data pairs.

The output of the first substracter s1 is connected to the second input of the adder sm via the low-pass filter tp, which acts as a PLL filter.

By the addition of the 45° digital word to the phase data dd, to the sign bit, and to the most significant bit of the output of the adder sm, reliable recovery of the phase-difference data is achieved.

We claim:

1. A sound channel circuit for digital television receivers, said sound channel circuit receiving a baseband analog sound and video signal developed by a television receiver and outputting an analog audio signal, the video portion of such baseband signal including a chrominance-subcarrier frequency, and the audio portion of said baseband signal having a predetermined bandwidth associated with a television-standard-dependent sound carrier frequency, said sound channel circuit comprising:

an analog antialiasing low-pass filter having an input receiving said baseband signal and low-pass filtering said baseband signal;

an analog-to-digital converter having an input coupled to the output of said analog antialiasing low-pass filter and having a sampling signal frequency on the order of four times the chrominance-subcarrier frequency of said baseband signal;

a digital bandpass filter having an input coupled to the output of said analog-to-digital converter, and having a midfrequency and bandwidth equal, respectively, to the received television-standard-dependent sound carrier frequency and the bandwidth associated therewith;

a decimation stage having an input coupled to the output of said bandpass filter, and having a clock signal derived by dividing the frequency of said sampling signal by a predetermined integer chosen such that said bandwidth is not affected by the decimation;

a digital low-pass filter having an input coupled to the output of said decimation stage, and having a frequency characteristic which is substantially flat in the pass region to pass the bandwidth of such television-standard-dependent sound carrier;

a phase splitter having an input coupled to the output of said digital low-pass filter, and having a 0° output and a 90° output;

a phase discriminator having an input coupled to the output of said phase splitter, and having an absolute-value output and a phase-angle output;

a digital frequency demodulation circuit including a DQPSK interface for processing DPSK data pairs and having an input coupled to the output of said phase discriminator, a decoder for the "NICAM" standard having an input coupled to the output of said DQPSK interface, and at least one differentiating stage having an input coupled to the output of said phase discriminator; and first, second, and third digital-to-analog converters having their inputs coupled, respectively, to said absolute-value output of said phase discriminator, to the output of said decoder, and to the output of said differentiating stage.

2. A sound channel circuit as claimed in claim 1 in which said DQPSK decoder interface serves to recover phase-difference data from multibit phase data present at the original data rate of DPSK data pairs, said DQPSK decoder interface comprising:

a first constant adder to which a digital word corresponding to the phase angle 45°, and the phase data, are applied;

an adder device having its first input connecting to the output of said first constant adder;

a first subtracter having its subtrahend input connected to the output of said adder device;

a second subtractor;

a DPSK decoder having an input coupled to the output of said second subtracter and providing the phase difference data to said NICAM decoder;

a delay element which provides a delay equal to the period of the data rate, and having an output coupled to the subtrahend input of said second subtracter;

a second constant adder to which the digital word corresponding to the phase angle 45° is applied, and having its output connected to the minuend input of said first subtracter, the sign bit and the most significant bit of the output of said adder device being fed to the minuend input of said second subtracter, to the input of said delay element, and to an input of said second constant adder; and a low-pass filter acting as a PLL filter via which the output of said first subtracter is connected to the second input of said adder device.

3. A sound channel circuit for digital television receivers, said sound channel circuit receiving a baseband analog sound and video signal developed by a television receiver and outputting an analog audio signal, the video portion of such baseband signal including a chrominance-subcarrier frequency, and the audio portion of said baseband signal having a predetermined bandwidth associated with a television-standard-dependent sound carrier frequency, said sound channel circuit comprising:

an analog antialiasing low-pass filter having an input receiving said baseband signal and low-pass filtering said baseband signal;

a single analog-to-digital converter having an input coupled to the output of said analog antialiasing low-pass filter and having a sampling signal frequency on the order of four times the chrominance-subcarrier frequency of said baseband signal;

a mixer having an input coupled to the output of said analog-to-digital converter, for separating the audio portion of said baseband signal from the video portion of said baseband signal;

a first digital low-pass filter having an upper frequency characteristic which falls off to zero just below one-half the sampling frequency reduced by the predetermined bandwidth of the audio portion of said baseband signal;

a decimation stage having an input coupled to the output of said first low-pass filter, and having a clock signal derived by dividing the frequency of said sampling signal by four;

a second digital low-pass filter having an input coupled to the output of said decimation stage, and having a frequency characteristic falling off to zero just above said bandwidth and substantially flat in the pass region to pass said bandwidth;

a phase splitter having an input coupled to the output of said second low-pass filter and having a 0° output and a 90° output;

a phase discriminator having an input coupled to the output of said phase splitter, and having an absolute-value output and a phase-angle output;

a digital frquency demodulation circuit including a DQPSK interface for processing DPSK data pairs and having an input coupled to the output of said phase discriminator, a decoder for the "NICAM" standard having an input coupled to the output of said DQPSK interface, and at least one differentiating stage having an input coupled to the output of said phase discriminator; and first, second, and third digital-to-analog converters having their inputs coupled, respectively, to said absolute-value output of said phase discriminator, to the output of said decoder, and to the output of said differentiating stage.

4. A sound channel circuit as claimed in claim 3 in which said DQPSK decoder interface serves to recover phase-difference data from multibit phase data present at the original data rate of DPSK data pairs, said DQPSK decoder interface comprising:

a first constant adder to which a digital word corresponding to the phase angle 45°, and the phase data, are applied;

an adder device having its first input connecting to the output of said first constant adder;

a first subtracter having its subtrahend input connected to the output of said adder device;

a second subtracter;

a DPSK decoder having an input coupled to the output of said second subtractor and providing the phase difference data to said NICAM decoder;

a delay element which provides a delay equal to the period of the data rate, and having an output coupled to the subtrahend input of said second subtracter;

a second constant adder to which the digital word corresponding to the phase angle 45° is applied, and having its output connected to the minuend input of said first subtracter, the sign bit and the most significant bit of the output of said adder device being fed to the minuend input of said second subtracter, to the input of said delay element, and to an input of said second constant adder; and a low-pass filter acting as a PLL filter via which the output of said first subtracter is connected to the second input of said adder device.

5. A sound channel for digital television receivers, said sound channel circuit receiving a baseband analog sound and video signal developed by a television receiver and outputting an analog audio signal, the video portion of such baseband signal including a chrominance-subcarrier frequency and the audio portion of said baseband signal having a predetermined bandwidth associated with a television-standard-dependent sound carrier frequency said sound channel circuit comprising:

an analog antialiasing low-pass filter having an input receiving said baseband signal and low-pass filtering said baseband signal;

a single analog-to-digital converter having an input coupled to the output of said analog antialiasing low-pass filter and having a sampling signal at a frequency on the order of four times the chrominance-subcarrier frequency of said baseband signal;

a quadrature mixture having an input coupled to the output of said analog-to-digital converter for separating out the sound signal portion of said band pass video and sound signal, said quadrature mixture including a sine mixer stage and a cosine mixer stage;

first and second digital low-pass filters having inputs coupled to, respectively, the outputs of said sine mixture stage and said cosine mixer stage, and having high frequency characteristics falling off to zero just below one-half the sampling frequency reduced by the predetermined bandwidth of the audio portion of said baseband signal;

first and second decimation stages having inputs connected, respectively, to the outputs of said first and second low-pass filters, said decimation stages having a common clock signal at a frequency equal to one quarter that of the frequency of the sampling signal;

third and fourth digital low-pass filters having inputs coupled, respectively, to the outputs of said first and second decimation stages, said third and fourth low-pass filters having frequency characteristics falling off to zero just above said bandwidth and substantially flat in the pass region to pass said bandwidth;

a phase descriminator having first and second inputs coupled to said third and fourth low-pass filters, respectively, and having an absolute-value output and a phase-angle output;

a digital frquency demodulation circuit including a DQPSK interface for processing DPSK data pairs and having an input coupled to the output of said phase discriminator, a decoder for the "NICAM" standard having an input coupled to the output of said DQPSK interface, and at least one differentiating stage having an input coupled to the output of said phase discriminator; and first, second, and third digital-to-analog converters having their inputs coupled, respectively, to said absolute-value output of said phase discriminator, to the output of said decoder, and to the output of said differentiating stage.

6. A sound channel circuit as claimed in claim 5 in which said DQPSK decoder interface serves to recover phase-difference data from multibit phase data present at the original data rate of DPSK data pairs, said DQPSK decoder interface comprising:

a first constant adder to which a digital word corresponding to the phase angle 45°, and the phase data, are applied;

an adder device having its first input connecting to the output of said first constant adder;

a first subtracter having its subtrahend input connected to the output of said adder device;

a second subtracter;

a DPSK decoder having an input coupled to the output of said second subtractor and providing the phase difference data to said NICAM decoder;

a delay element which provides a delay equal to the period of the data rate, and having an output coupled to the subtrahend input of said second subtracter;

a second constant adder to which the digital word corresponding to the phase angle 45° is applied, and having its output connected to the minuend input of said first subtracter, the sign bit and the most significant bit of the output of said adder device being fed to the minuend input of said second subtracter, to the input of said delay element, and to an input of said second constant adder; and a low-pass filter acting as a PLL filter via which the output of said first subtracter is connected to the second input of said adder device.

* * * * *